(12) United States Patent
Leslie et al.

(10) Patent No.: US 11,461,513 B2
(45) Date of Patent: Oct. 4, 2022

(54) DATA CENTER POWER SCENARIO SIMULATION

(71) Applicant: Virtual Power Systems, Inc., Milpitas, CA (US)

(72) Inventors: Martin P Leslie, San Jose, CA (US); Karimulla Raja Shaikh, Cupertino, CA (US); Nikhil Sharma, El Dorado Hills, CA (US); Ravi Subramaniam, San Jose, CA (US); Shankar Ramamurthy, Saratoga, CA (US)

(73) Assignee: Cato, Milpitas, CA (US)

( * ) Notice: Subject to any disclaimer, the term of this patent is extended or adjusted under 35 U.S.C. 154(b) by 0 days.

(21) Appl. No.: 15/910,315

(22) Filed: Mar. 2, 2018

(65) Prior Publication Data

US 2018/0189432 A1   Jul. 5, 2018

Related U.S. Application Data

(63) Continuation-in-part of application No. 15/829,235, filed on Dec. 1, 2017, now Pat. No. 11,107,016, (Continued)

(51) Int. Cl.
*G06Q 50/06* (2012.01)
*G06F 1/26* (2006.01)
(Continued)

(52) U.S. Cl.
CPC .............. *G06F 30/20* (2020.01); *G06F 1/189* (2013.01); *G06F 1/206* (2013.01); *G06F 1/263* (2013.01);
(Continued)

(58) Field of Classification Search
CPC ... G06F 1/28; G06F 1/30; G06F 1/189; G06F 1/206; G06F 1/263; G06F 1/3206;
(Continued)

(56) References Cited

U.S. PATENT DOCUMENTS 6,396,170 B1   5/2002 Laufenberg et al.
6,967,283 B2   11/2005 Rasmussen et al.
(Continued)

FOREIGN PATENT DOCUMENTS

EP   2372861 B1   10/2011
JP   2009232521 A   10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — M. N. Von Buhr

(57) ABSTRACT

In disclosed techniques, simulations are performed to determine data center performance under certain conditions. The simulations are dynamic and allow for changes in power demand due to temporal data center activities. In order to accommodate predicted and unpredicted fluctuations in power demand of a data center, one or more power caches are configured to supply additional power during periods of peak demand. Power caches provide supplemental power during periods of peak demand. The simulations are used for a variety of purposes, including determining the effects of power caches going offline under various conditions. Disclosed techniques can simulate the cycling of a power cache and can determine if additional configuration changes to the data center are warranted to maintain optimal health of the power caches. Thus, power scenario simulation of a data center can provide information vital to efficient operation of the data center.

28 Claims, 11 Drawing Sheets

Related U.S. Application Data which is a continuation-in-part of application No. 15/680,286, filed on Aug. 18, 2017, now Pat. No. 11,314,304.

(60) Provisional application No. 62/550,009, filed on Aug. 25, 2017, provisional application No. 62/527,091, filed on Jun. 30, 2017, provisional application No. 62/523,732, filed on Jun. 22, 2017, provisional application No. 62/511,130, filed on May 25, 2017, provisional application No. 62/480,386, filed on Apr. 1, 2017, provisional application No. 62/376,881, filed on Aug. 18, 2016.

(51) Int. Cl.
| | |
|---|---|
| *G06F 30/20* | (2020.01) |
| *G06F 1/3206* | (2019.01) |
| *G06F 1/28* | (2006.01) |
| *H05K 7/14* | (2006.01) |
| *G06F 1/20* | (2006.01) |
| *G06F 1/18* | (2006.01) |
| *G06F 1/30* | (2006.01) |
| *G06Q 10/04* | (2012.01) |
| *G16Z 99/00* | (2019.01) |
| *G06Q 10/06* | (2012.01) |
| *H02J 9/06* | (2006.01) |
| *G06F 30/367* | (2020.01) |
| *G06F 119/06* | (2020.01) |

(52) U.S. Cl.
CPC .............. *G06F 1/28* (2013.01); *G06F 1/30* (2013.01); *G06F 1/3206* (2013.01); *G06Q 10/04* (2013.01); *G06Q 10/06* (2013.01); *G06Q 50/06* (2013.01); *G16Z 99/00* (2019.02); *H05K 7/1498* (2013.01); *G06F 30/367* (2020.01); *G06F 2119/06* (2020.01); *H02J 9/06* (2013.01)

(58) Field of Classification Search
CPC ............ G06F 9/4893; G06F 17/5009; G06F 17/5036; G06F 19/00; G06F 2217/78; G06F 30/20; G06F 30/367; G06F 2119/06; G06Q 10/04; G06Q 10/06; G06Q 50/06; H02J 9/06; H05K 7/1498; Y02D 10/00; G16Z 99/00

See application file for complete search history.

(56) References Cited

U.S. PATENT DOCUMENTS

| | | | |
|---|---|---|---|
| 7,236,896 B2 | 6/2007 | Farkas et al. | |
| 8,193,662 B1 | 6/2012 | Carlson et al. | |
| 8,401,833 B2* | 3/2013 | Radibratovic | G06Q 10/04 703/13 |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,756,047 B2* | 6/2014 | Patel | G06N 3/08 703/18 |
| 8,958,923 B2 | 2/2015 | Kake et al. | |
| 9,641,025 B2 | 5/2017 | Agrawal et al. | |
| 9,865,998 B1 | 1/2018 | Emert et al. | |
| 9,871,408 B2 | 1/2018 | Narita | |
| 10,007,746 B1* | 6/2018 | Wolfovitz | G06F 30/3323 |
| 10,128,684 B2* | 11/2018 | Ramamurthy | H02J 9/061 |
| 10,429,914 B2* | 10/2019 | Shaikh | G06F 1/189 |
| 2003/0056125 A1 | 3/2003 | O'Conner et al. | |
| 2004/0181441 A1* | 9/2004 | Fung | G06Q 10/06375 705/7.36 |
| 2005/0071092 A1 | 3/2005 | Farkas et al. | |
| 2005/0162019 A1 | 7/2005 | Masciarelli et al. | |
| 2006/0082222 A1 | 4/2006 | Pincu et al. | |
| 2007/0216229 A1 | 9/2007 | Johnson et al. | |
| 2008/0067872 A1 | 3/2008 | Moth | |
| 2008/0320322 A1 | 12/2008 | Green et al. | |
| 2009/0144568 A1 | 6/2009 | Fung | |
| 2010/0037070 A1 | 2/2010 | Brumley et al. | |
| 2010/0037225 A1 | 2/2010 | Doyle et al. | |
| 2010/0058092 A1 | 3/2010 | Bougaev et al. | |
| 2010/0077238 A1 | 3/2010 | Vogman et al. | |
| 2010/0102633 A1 | 4/2010 | Seaton | |
| 2010/0169065 A1* | 7/2010 | Joshi | G06F 1/30 703/16 |
| 2010/0205469 A1 | 8/2010 | McCarthy et al. | |
| 2010/0211810 A1 | 8/2010 | Nacho | |
| 2010/0264741 A1 | 10/2010 | Togare | |
| 2010/0328849 A1 | 12/2010 | Ewing et al. | |
| 2011/0133559 A1 | 6/2011 | Yamashita et al. | |
| 2011/0245988 A1 | 10/2011 | Ingels et al. | |
| 2011/0264937 A1 | 10/2011 | Meisner et al. | |
| 2011/0302432 A1 | 12/2011 | Harris et al. | |
| 2011/0304211 A1 | 12/2011 | Peterson et al. | |
| 2012/0054512 A1 | 3/2012 | Archibald et al. | |
| 2012/0066519 A1 | 3/2012 | El-Essawy et al. | |
| 2012/0303993 A1 | 11/2012 | Nishtala et al. | |
| 2013/0145375 A1* | 6/2013 | Kang | G06F 9/5083 718/104 |
| 2014/0039683 A1* | 2/2014 | Zimmermann | G06F 1/329 700/275 |
| 2014/0086075 A1* | 3/2014 | Asokan | H04W 24/06 370/252 |
| 2014/0297567 A1* | 10/2014 | Oe | G06Q 50/06 705/412 |
| 2014/0337002 A1* | 11/2014 | Manto | G06Q 50/06 703/18 |
| 2015/0025696 A1* | 1/2015 | Hug | G06Q 50/06 700/286 |
| 2015/0057821 A1 | 2/2015 | Nasle | |
| 2015/0121113 A1* | 4/2015 | Ramamurthy | H02J 9/062 713/340 |
| 2015/0242243 A1* | 8/2015 | Balakrishnan | G06F 9/5094 718/104 |
| 2015/0378408 A1 | 12/2015 | Kaplan | |
| 2015/0380968 A1 | 12/2015 | Lee | |
| 2016/0020609 A1* | 1/2016 | Carrasco | G05B 15/02 700/295 |
| 2016/0109916 A1* | 4/2016 | Li | H02J 7/35 700/295 |
| 2016/0209901 A1 | 7/2016 | Wilcox et al. | |
| 2016/0320825 A1 | 11/2016 | Panda et al. | |
| 2017/0005515 A1 | 1/2017 | Sanders | |
| 2017/0025876 A1 | 1/2017 | Chan | |
| 2017/0083382 A1* | 3/2017 | LeBeane | G06F 1/329 |
| 2017/0083383 A1* | 3/2017 | Rider | G06F 9/5094 |
| 2017/0102726 A1* | 4/2017 | Goldsmith | G06Q 50/06 |
| 2017/0177047 A1 | 6/2017 | Fluman et al. | |
| 2017/0201425 A1* | 7/2017 | Marinelli | H04L 41/12 |
| 2017/0322241 A1* | 11/2017 | Tang | H02J 3/00 |
| 2018/0052431 A1* | 2/2018 | Shaikh | G06F 9/5094 |
| 2018/0082224 A1* | 3/2018 | Leslie | G06F 9/4893 |
| 2018/0314930 A1* | 11/2018 | Ho | G06N 5/003 |
| 2018/0341307 A1* | 11/2018 | Shaikh | G06F 1/263 |
| 2019/0115753 A1* | 4/2019 | Sheehan | H02J 13/0006 |
| 2019/0122132 A1 | 4/2019 | Rimini et al. | |

FOREIGN PATENT DOCUMENTS

| | | |
|---|---|---|
| WO | WO2011119444 A2 | 9/2011 |
| WO | WO2012091323 A2 | 7/2012 |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

(56) References Cited

OTHER PUBLICATIONS

Muccini, Mark, el al., "Power Consumption Reduction: Hot Spare", A Dell technical white paper, Feb. 2012, Rev. 1.0, Dell, Inc.
Meisner, David, Brian T. Gold, and Thomas F. Wenisch. "PowerNap: eliminating server idle power." ACM SIGARCH Computer Architecture News 37.1 (2009): 205-216.
International Search Report dated Feb. 9, 2015 for PCT/US2014/062650.
International Search Report dated Jan. 30, 2015 for PCT/US2014/062684.

* cited by examiner

DATA CENTER POWER SCENARIO SIMULATION

RELATED APPLICATIONS

This application claims the benefit of U.S. provisional patent applications "Data Center Power Scenario Simulation" Ser. No. 62/480,386, filed Apr. 1, 2017, "Secure Communication Initiation and Execution for Datacenter Power Control" Ser. No. 62/511,130, filed May 25, 2017, "Augmented Power Control Within a Datacenter Using Predictive Modeling" Ser. No. 62/527,091, file Jun. 30, 2017, "Datacenter Power Management Using AC and DC Power Sources" Ser. No. 62/523,732, filed Jun. 22, 2017, and "Scalable Datacenter Power Infrastructure Management" Ser. No. 62/550,009, filed Aug. 25, 2017.

This application is also a continuation-in-part of U.S. patent application "Augmented Power Control Within a Datacenter Using Predictive Modeling" Ser. No. 15/829,235, filed Dec. 1, 2017, which claims the benefit of U.S. provisional patent applications "Augmented Power Control Determination Within a Datacenter" Ser. No. 62/527,091, filed Jun. 30, 2017, "Data Center Power Scenario Simulation" Ser. No. 62/480,386, filed Apr. 1, 2017, "Secure Communication Initiation and Execution for Data Center Power Control" Ser. No. 62/511,130, filed May 25, 2017, "Datacenter Power Management Using AC and DC Power Sources" Ser. No. 62/523,732, filed Jun. 22, 2017, "Scalable Datacenter Power Infrastructure Management" Ser. No. 62/550,009, filed Aug. 25, 2017.

The application "Augmented Power Control Within a Datacenter Using Predictive Modeling" Ser. No. 15/829,235, filed Dec. 1, 2017 is a continuation-in-part of U.S. patent application "Datacenter Power Management Using Variable Power Sources" Ser. No. 15/680,286, filed Aug. 18, 2017, which claims the benefit of U.S. provisional patent application "Automated Intelligent Scheduling of Energy Storage in Data Centers" Ser. No. 62/376,881, filed Aug. 18, 2016.

Each of the foregoing applications is hereby incorporated by reference in its entirety.

FIELD OF ART

This application relates generally to power control and more particularly to data center power scenario simulation.

BACKGROUND

A data center is a facility that centralizes an organization's information technology (IT) operations and equipment, and stores, manages, and disseminates its data. Data centers contain various critical systems belonging to a network and are vital to maintaining continuous operations. Consequently, protecting the security and reliability of data centers and their information is a top priority for organizations.

For data center power requirements, electricity costs can consume a considerable portion of the operating budget. Data centers can house many rows of servers, storage devices, routers, and other IT equipment placed together in racks, and thus the electricity demand to effectively power and cool the facility is often very high. Additionally, the power demand for both industrial applications and data centers can fluctuate based on various business factors, such as the time of day or season. Thus, managing power becomes an important aspect of many industrial applications, including data center administration. Even further, any energy savings achieved can translate into increased profit margins for an organization. Energy savings can provide additional benefits to an organization such as reduced wear and tear on power sources and reduced cooling costs.

Within data centers, also known as "server farms," there can be hundreds or even thousands of racks. The devices on the racks provide functionality, including the storage, processing, and retrieval of data. Given the power requirements demanded by the rack-mounted devices, reliable and efficient power delivery is crucial for successful operation of the organizations using the data centers. In some cases, the reliability and availability obligations placed on the devices powering the data center infrastructure must meet or exceed predetermined statutory requirements, as is the case with financial institutions.

Regardless of the type of institution, various infrastructure requirements must be met in order to address the important issues of availability, reliability, job load, and other organizational requirements of data centers. For example, the issue of effectively cooling a data center (i.e. the removal of excess heat) is a critical issue which must be addressed to ensure stable and reliable operation of the data center. Each of the many devices in the data center generates substantial amounts of heat, whether the device is a server, a blade, a switch, a backup unit, a communications unit, or another device. The cooling of modern data centers can directly impact the layout and design of the center. Another significant data center design consideration involves providing sufficient power to the data center. Particularly in the case of high-reliability data centers, such as those used for e-commerce, banking, airline reservations, video distribution, and the like, power can be provided by more than one power grid, while for other data centers, power can be provided by a combination of a power grid and locally generated power. Thus, providing reliable and efficient power to the large number of computers and associated equipment in modern data centers or server farms is an important aspect contributing to the performance of these operations.

SUMMARY

The power requirements of a data center can vary over time based on application activity, planned maintenance, unplanned equipment failure, and other factors. Data centers provide vital functions for businesses, governments, educational institutions, and other enterprises. Characterizing the behavior of data center power consumption is essential to maintaining consistent reliability of the data centers. Disclosed techniques provide systems and methods for power analysis through simulation of dynamic power scenarios. Conjecture scenarios, previous power experiences, and baseline configurations are analyzed via simulation to determine if the data center is at risk of an unplanned outage, and/or is operating within an efficient range.

Furthermore, the power requirements for a data center are typically dynamic in nature. The power requirements depend on the electronic and electrical equipment within the datacenter and can be based on AC loads and DC loads. The power requirements of the datacenter can vary over time based on application activity, planned maintenance, unplanned equipment failure, and other factors. The time-variable power requirements can include increases during normal business hours, and subsequent decreases after business hours and/or on weekends. The makeup of AC load demand vs. DC load demand can also change. Datacenters provide vital functions for businesses, governments, educational institutions, and other enterprises. Characterizing the behavior of datacenter power consumption is essential to maintain consistency and reliability of the datacenters. Software Defined Power supports datacenter power requirements and includes 1N redundancy, 2N redundancy, carbon footprint management, cost of energy, or source of energy.

Disclosed techniques provide a computer-implemented method for power analysis comprising: obtaining a description of a first set of power loads for a data center; obtaining a description of a first set of power supplies coupled to the first set of power loads wherein the first set of power supplies is further coupled to a first set of power caches; and simulating a dynamic power scenario with the first set of power loads, the first set of power supplies, and the first set of power caches. In embodiments, the dynamic power scenario includes a temporal component. In embodiments, the first set of power loads is distributed across a plurality of data racks. Additionally, in embodiments, the first set of power caches provides power when power requirements from the first set of power loads exceed capabilities of the first set of power supplies. In embodiments, the simulating includes providing recommendations for changing topology of the data center. Some embodiments further comprise changing topology of the data center and re-simulating the dynamic power scenario.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
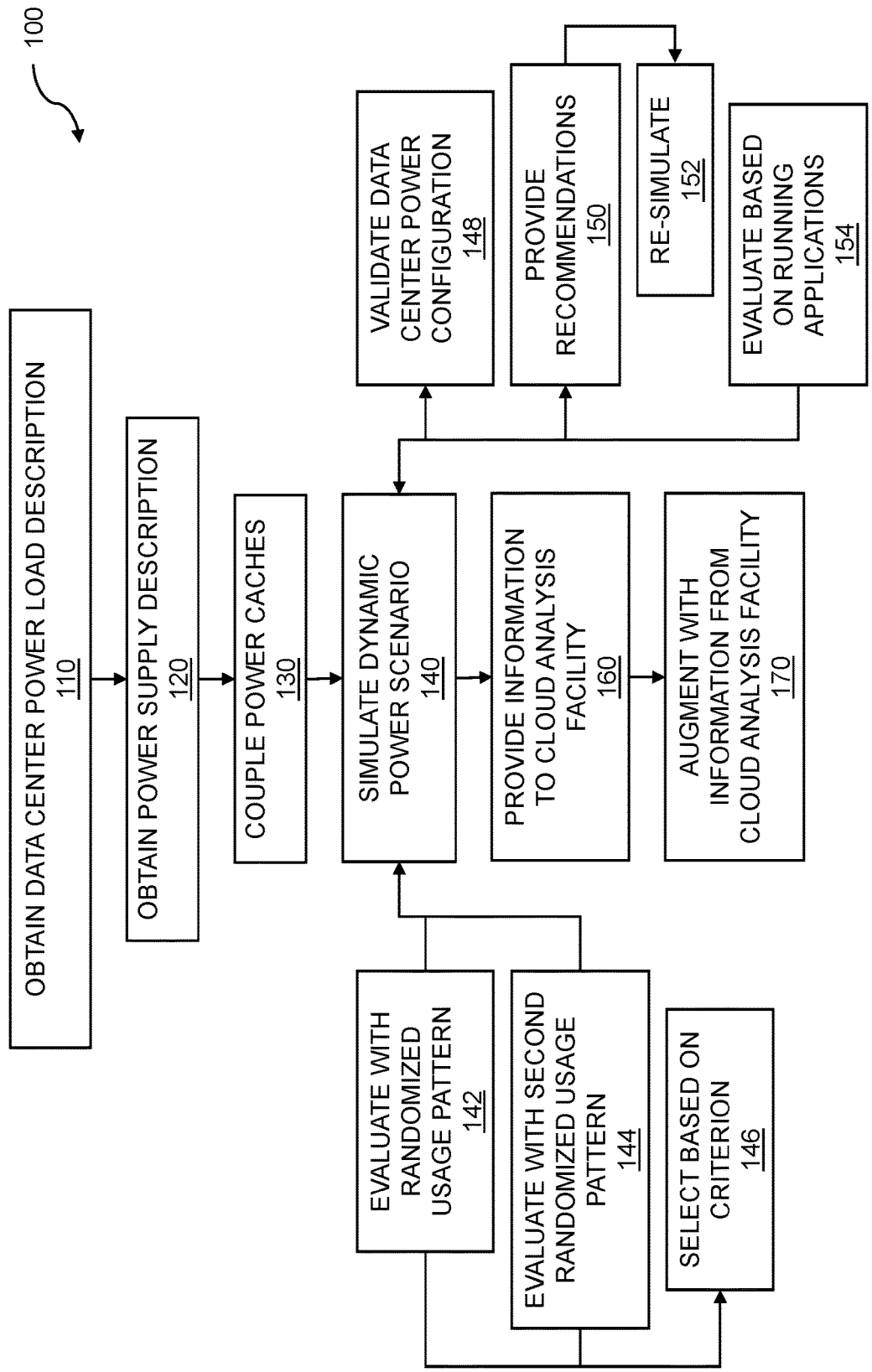
FIG. 1 is a flow diagram for power scenario simulation.

Data centers can contain hundreds or even thousands of computers and other associated equipment, such as disk arrays, data backups, routers, and other networking and storage equipment. Managing power distribution for efficiency and reliability can be challenging. This disclosure provides techniques for the simulation of dynamic power scenarios. Given certain constraints, such as peak operating power, peak duration, availability of alternate power sources, and the like, policies can be established that decide how power is to be allocated among various devices within the data center. Simulations of dynamic power scenarios can be used to validate and/or reject policies based on the results obtained from the simulations.

In disclosed techniques, simulations are performed to determine data center function under certain specified conditions. The simulations are dynamic and allow for changes in power demand due to temporal data center activities. For example, backup operations may be scheduled during overnight hours and may have a particular load signature. That is, they may exert a specific power demand on the system(s) that supply power to the data center. An effective simulation relies on accurate modeling of power loads, including the temporal behaviors of such loads.

In addition to power loads, the performance of the power supplies is also considered in the simulations. Power supplies can include infrastructure-based power supplies such as grid-based power supplies and local power supplies such as diesel generators, wind turbines, hydroelectric power, and the like. Power supplies can go offline for a variety of planned and unplanned reasons. Scheduled or planned reasons can include taking a power supply offline for maintenance or upgrade. Unplanned power supply interruption can occur due to equipment failure, storm damage, fires, and other similar events. Disclosed techniques enable simulation of such planned and unplanned events. Furthermore, a conjecture scenario for power consumption can be performed, in which various power supply interruption scenarios can be performed. For example, if power supplies are to be taken offline for scheduled maintenance, a simulation can be performed first, to determine the impact of taking the power supplies offline, and/or to determine an appropriate opportunity (e.g. day of week, time of day, etc.) for performing the maintenance.

In order to accommodate predicted and unpredicted fluctuations in power demand of a data center, one or more power caches can be configured to supply additional power during periods of peak demand. Power caches, similar to power supplies, can also be subject to failure, and/or can require downtime for maintenance or part replacement. Thus, simulations can be used to determine the effects of power caches going offline under various conditions. Further, power caches inherently require a cycling program for optimal performance and shelf life. If power caches are rarely cycled, the effect can be a great reduction in both their performance and shelf life. Similarly, if power caches are constantly being fully discharged and recharged, their performance and shelf life can be diminished. Disclosed techniques can simulate the cycling of a power cache and can determine if additional configuration changes to the data center are warranted to maintain optimal health of the power caches. Thus, power scenario simulation of a data center can provide information vital to the efficient operation of the data center.

FIG. 1 is a flow diagram for power scenario simulation. The flow 100 illustrates a computer-implemented method for power analysis. The flow 100 includes obtaining a description of a data center first set of power loads 110. In some embodiments, the obtaining a description of a first set of power loads is accomplished on a first computing device. The power loads can include a description of one or more racks within a data center. Thus, in embodiments, the first set of power loads is distributed across a plurality of data racks. Within each rack, there can be one or more computers installed. For each computer, there are descriptive fields which can include, but are not limited to, power consumption per core of single core processing units, power consumption per core of multiple core processing units, number of single core processing units per computer, and number of multiple core processing units per computer. The description may also include information about storage components.

The description can include information regarding power consumption due to installed random access memory (RAM), solid state disk drives, and/or magnetic disk drives.

The flow 100 also includes obtaining a description of a first set of power supplies 120 coupled to the first set of power loads 110 wherein the first set of power supplies is further coupled to a first set of power caches 130. In some embodiments, the obtaining a description of a first set of power supplies is accomplished on a first computing device. In embodiments, the first set of power caches provides power when power requirements from the first set of power loads exceed the capabilities of the first set of power supplies. The description of the power loads can include preferred source type and infrastructure types specified. The description can include a power origin type. The power origin type can include, but is not limited to, natural gas, coal, nuclear, hydroelectric, wind, flywheel, and/or solar. The description can include an output wattage, output voltage, and/or output frequency. Additional descriptive parameters can include, but are not limited to, the power factor, total harmonic distortion (THD), active power (kW), reactive power (kVAr), apparent power (kVA), active energy (kWh), reactive energy (kVArh) and/or apparent energy (kVAh). The process can further include obtaining a description of power caches that are used to supply additional power during periods of peak consumption. In embodiments, the simulating of a dynamic power scenario is accomplished on a second computing device. In some embodiments, the first computing device and the second computing device are a common computing device or are the same computing device.

The flow 100 includes simulating a dynamic power scenario 140 with the first set of power loads 110, the first set of power supplies 120, and the first set of power caches 130. In embodiments, the first set of power supplies comprises a single power supply. In some embodiments, the first set of power caches comprises a single power cache. In embodiments, the dynamic power scenario 140 includes a temporal component. The temporal component can allow for various daily activities. For example, data backups may be performed during an overnight time window. Conversely, an application that performs banking transactions may operate at a peak activity level during normal business hours. Other activity may trend on a weekly or monthly basis. For example, in many data centers, an extended backup process is performed on a weekly basis. The extended backup process may include a full backup, and/or additional data transfers that do not occur during the week. For some applications, such as those that process financial data to create reports, the power consumption can vary depending on the time of the month, or at certain times of the year (e.g. at the end of a business quarter). In embodiments, the simulating is for a baseline configuration for power within the data center. The baseline configuration can be representative of a nominal range of operating conditions, an average power consumption rate, or other suitable metric against which other dynamic power scenarios are compared. In embodiments, the simulating includes evaluating the first set of power loads based on applications running on servers within the first set of power loads. In embodiments, the simulating analyzes a failure for the power scenario.

The dynamic power scenario can further include information based on the obtained description of power loads and power supplies. The flow 100 can include providing recommendations 150 based on the results of the simulation of the dynamic power scenario. For example, the recommendations can include a validation of a data center power configuration 148, or an indication of a point of failure for the design under the expected temporal conditions. Thus, in embodiments, the simulating includes validating a data center power configuration 148. The recommendations can include configuration changes such as adding or removing additional power supplies, power loads, and/or power caches. The flow 100 can further include re-simulating 152 the dynamic power scenario based on the provided recommendations 150. In embodiments, the simulating of the power scenario covers a period of time in the data center. The period of time can be an hour, a day, a week, a month, or other suitable time period. Thus, in embodiments, the simulating includes providing recommendations for changing topology of the data center.

The simulating of the dynamic power scenario 140 can be evaluated based on running applications 154. This can entail determining which applications are executing on a particular data rack, or within a particular cluster of data racks. Different applications have different power requirements depending on what tasks they are performing. Furthermore, some applications have control over how many cores they use. In some simulations, the number of cores in use for an application may be specified as part of the simulation. Using fewer cores may result in a lower rate of power consumption. However, using fewer cores can also have the effect of certain tasks taking longer to complete. Embodiments may consider an estimated task completion time based on the number of cores allocated for a given task while performing a simulation of a dynamic power scenario. In embodiments, the capabilities of the first set of power supplies are defined by parameter policies. The parameter policies can include various parameters that define the behavior of the power supplies under certain conditions. For example, the parameter policies can include a duration for which the power supplies can operate at a maximum output level.

While some application tasks have a strong temporal relationship (e.g. performing a backup operation at a set time each night), other application tasks do not follow such a strict temporal schedule. In some embodiments, the simulating of the dynamic power scenario is evaluated with a randomized usage pattern 142. Thus, in embodiments, the simulating includes evaluating the first set of power loads using a first randomized pattern of component usage for the first set of power loads. This simulation can include: power supplies coming offline at various random times, power loads being activated and deactivated at random times, power consumption increasing at random times, and power caches failing at random times, as examples. The flow can include evaluation with a second randomized usage pattern 144, where the second randomized usage pattern is different than the first randomized usage pattern. Thus, in embodiments, the simulating further includes evaluating the first set of power loads with a second randomized pattern of component usage for the first set of power loads. The flow can include selecting a randomized usage pattern based on a selection criterion 146. Thus, the simulating may further comprise selecting one of the first randomized patterns of component usage and the second randomized pattern of component usage, based on a selection criterion 146, for operation of the first set of power loads. For example, if one of the randomized usage patterns is shown to be problematic during the simulation of a dynamic power scenario, then one or more power/parameter policies can be implemented to prevent that usage pattern from occurring. For example, if a particular usage pattern of applications executing within a cluster of data racks causes that cluster of data racks to exceed a desired power consumption rate, then a policy can be enacted to distribute the application execution amongst multiple clusters to prevent a particular data rack cluster from exceeding a predetermined power consumption threshold. In embodiments, the randomization may be bounded to reflect values within possible operating conditions of a particular component. For example, if a power supply can supply a maximum output of 1.5 kW, then the randomization range for that power supply may run from a minimum of zero to a maximum of 1.5 kW. Similarly, if a different power supply can supply a maximum output of 3 kW, then the randomization range for that power supply may run from a minimum of zero to a maximum of 3 kW.

In other embodiments, the simulating analyzes a previous power experience by the data center. In embodiments, the previous power experience includes a failure power scenario. For example, if a data center experienced an outage, data collected from the outage can be used as part of a simulation. The data can include log files from computers running in the data racks, log files from power supplies, power distribution units, rack distribution power units, uninterruptible power supplies, and/or other suitable sources of data. The data can be used to generate a simulation of a dynamic power scenario that represents the previous power experience. In this way, the failure can be analyzed to determine a root cause. In embodiments, the failure includes a capacity, for the first set of power supplies and the first set of power caches, being exceeded by the first set of power loads. Embodiments can further include providing information to a cloud analysis facility 160. Thus, embodiments include providing information on both the power scenario and the simulating to a cloud analysis facility. The cloud analysis facility may include one or more computers hosting one or more applications for performing additional analysis and/or simulation of dynamic power scenarios. In some embodiments, the power load descriptions, power supply descriptions, power cache descriptions, data center topology information, and power/parameter policy information is provided to the cloud analysis facility. In embodiments, the cloud analysis facility may perform the simulation of the dynamic power scenario. In some embodiments, the simulation information is augmented with information from the cloud analysis facility 170. Thus, embodiments include augmenting the simulating with information from a cloud analysis facility. The augmented information can include, but is not limited to, statistics from other data center dynamic power simulations. In some embodiments, simulations from data centers with a similar topology, size, and/or application hosting may be provided as a comparison to the simulated dynamic power scenario 140.

In some embodiments, the augmented information may be anonymized. In some embodiments, the augmented information includes one or more records from a knowledge base. In embodiments, simulations from multiple data centers may be stored in a knowledge base accessible by, or included in, the cloud analysis facility. Additionally, previous power experiences from multiple data centers may also be stored in the knowledge base accessible by, or included in, the cloud analysis facility. Furthermore, resolutions to previous power experiences and/or simulated dynamic power scenarios can be stored in the knowledge base. In this way, if a data center encounters a particular failure, a resolution from a similar scenario at another data center can be made available to the user (e.g. a data center administrator) based on a simulated dynamic power scenario, or a previous power experience. In this way, knowledge and "lessons learned" from previous simulations can be shared, improving overall data center reliability. Thus, in embodiments, the simulating includes a resolution to the previous power experience that includes the failure for the power scenario. In embodiments, the simulating includes a failure power scenario. In embodiments, the simulating includes evaluating the first set of power loads based on applications running on a load platform within the first set of power loads. In embodiments, the load platform comprises one or more servers. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
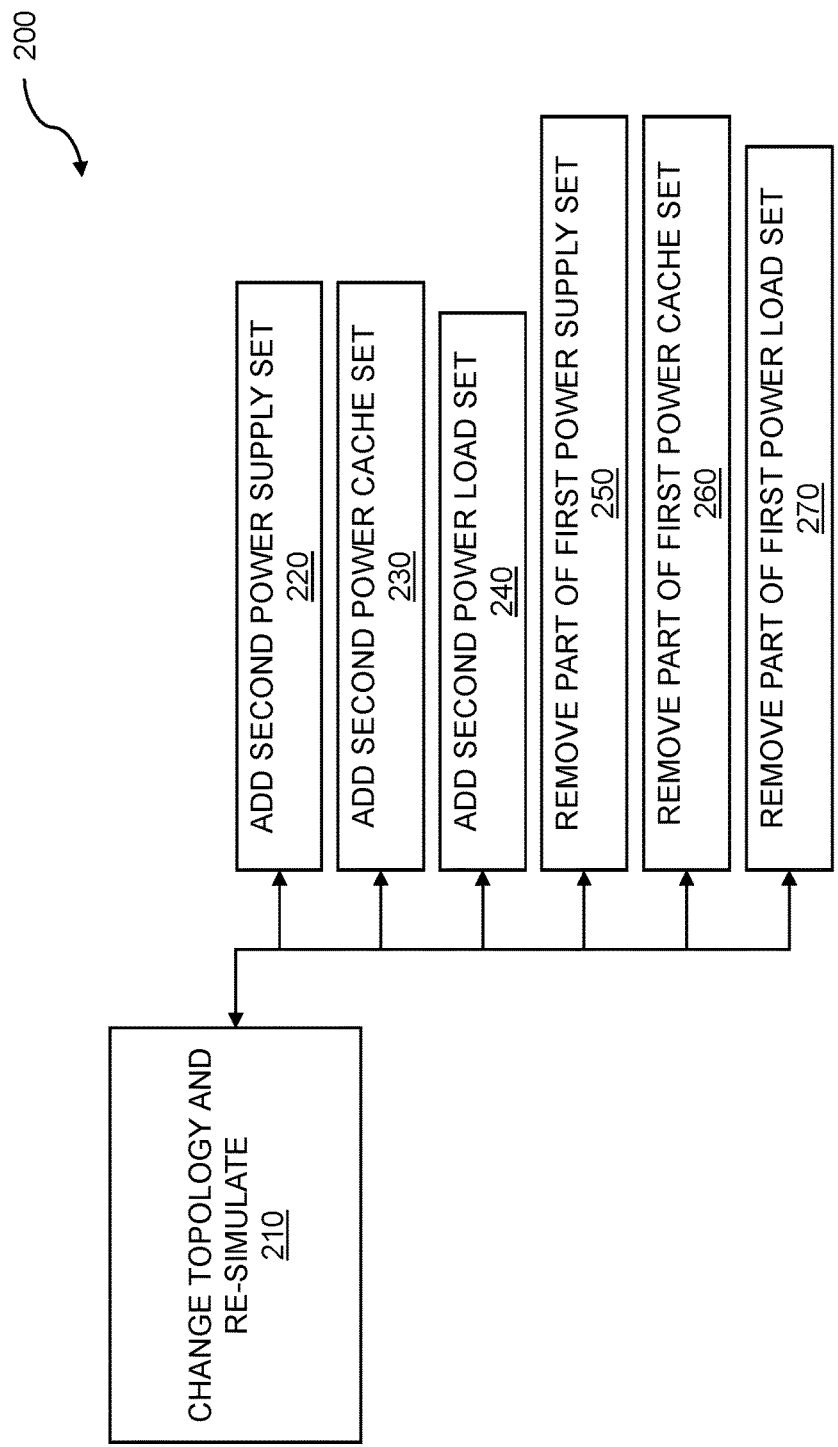
FIG. 2 is a flow diagram for changing a topology of a data center.

FIG. 2 is a flow diagram for changing topology of a data center. The flow 200 includes changing topology of the data center and re-simulating the power scenario 210. In embodiments, the changing topology includes adding a second set of power supplies 220. This action may be taken when a simulation of a dynamic power scenario reveals that there could be insufficient power during extended periods of high load. The re-simulating includes evaluation of a conjecture scenario for power consumption. The conjecture scenario may reveal that the data center is potentially vulnerable to an unplanned outage if one or more power supplies fail. In such cases, additional power supplies are added and the simulation is repeated with the newly added power supplies to determine if they resolve the issues detected during a previous simulation. The second set of power supplies, along with the first set of power supplies, provides power to the first set of power loads.

In embodiments, the changing topology includes adding a second set of power caches 230. This action may be taken when a simulation of a dynamic power scenario reveals that there could be insufficient power during relatively brief periods of high demand. Additionally, a conjecture scenario may reveal that the data center is vulnerable to an unplanned outage during a period of high demand. In such cases, additional power caches are added and the simulation is repeated with the newly added power caches to determine if they resolve the issues detected during a previous simulation. The second set of power caches, along with the first set of power caches, provides power to the first set of power loads.

In embodiments, the changing topology includes adding a second set of power loads 240. This action may be taken when a simulation of a dynamic power scenario reveals that there could be insufficient cycling of power caches. The shelf life of a power cache depends in part on a proper amount of cycling. If a power cache is rarely cycled (partially or completely depleted), or alternatively, is fully depleted too often, then the power cache may prematurely fail. Additional power loads can be added to ensure that each power cache has an opportunity to achieve an appropriate level of cycling. Additionally, a simulation may reveal that the data center is not operating in an efficient range due to a power surplus. In such cases, additional power loads are added and the simulation is repeated with the newly added power loads to determine if they resolve the issues detected during a previous simulation. In embodiments, the first set of power supplies provides power to both the first and second set of power loads.

The changing topology includes removing part of the first set of power supplies 250. This action may be taken when a simulation of a dynamic power scenario reveals that there could be insufficient cycling of power caches. The shelf life of a power cache depends in part on a proper amount of cycling. If a power cache is rarely cycled (partially or completely depleted), or alternatively, is fully depleted too often, then the power cache may prematurely fail. Some of the power supplies can be removed to ensure that each power cache has an opportunity to achieve an appropriate level of cycling. Additionally, a simulation may reveal that the data center is not operating in an efficient range due to a power surplus. By removing power supplies, less power is available, increasing the probability that power caches will be cycled. In such cases, some power supplies can be removed and the simulation can be repeated to determine if they resolve the issues detected during a previous simulation.

In embodiments, the changing topology includes removing part of the first set of power caches 260. This action may be taken when a simulation of a dynamic power scenario reveals that there could be insufficient cycling of power caches. The shelf life of a power cache depends in part on a proper amount of cycling. If a power cache is rarely cycled (partially or completely depleted), or alternatively, is fully depleted too often, then the power cache may prematurely fail. Some of the power caches can be removed to ensure that each of the remaining power caches has an opportunity to achieve an appropriate level of cycling. In such cases, some power caches can be removed and the simulation can be repeated to determine if they resolve the issues detected during a previous simulation.

The changing topology includes removing part of the first set of power loads 270. This action may be taken when a simulation of a dynamic power scenario reveals that there could be insufficient power during extended periods of high demand. Additionally, a conjecture scenario may reveal that the data center is potentially vulnerable to an unplanned outage if one or more power supplies fail, or if demand exceeds expected levels. A conjecture scenario can further reveal that the data center is operating outside of a preferred efficiency range. In such cases, some power loads are removed and the simulation is re-enacted with a reduction in power loads to determine if that resolves the issues detected during a previous simulation. In embodiments, the topology within the data center includes power flow control. Power flow control can be implemented using smart switches to selectively connect power sources with power loads. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
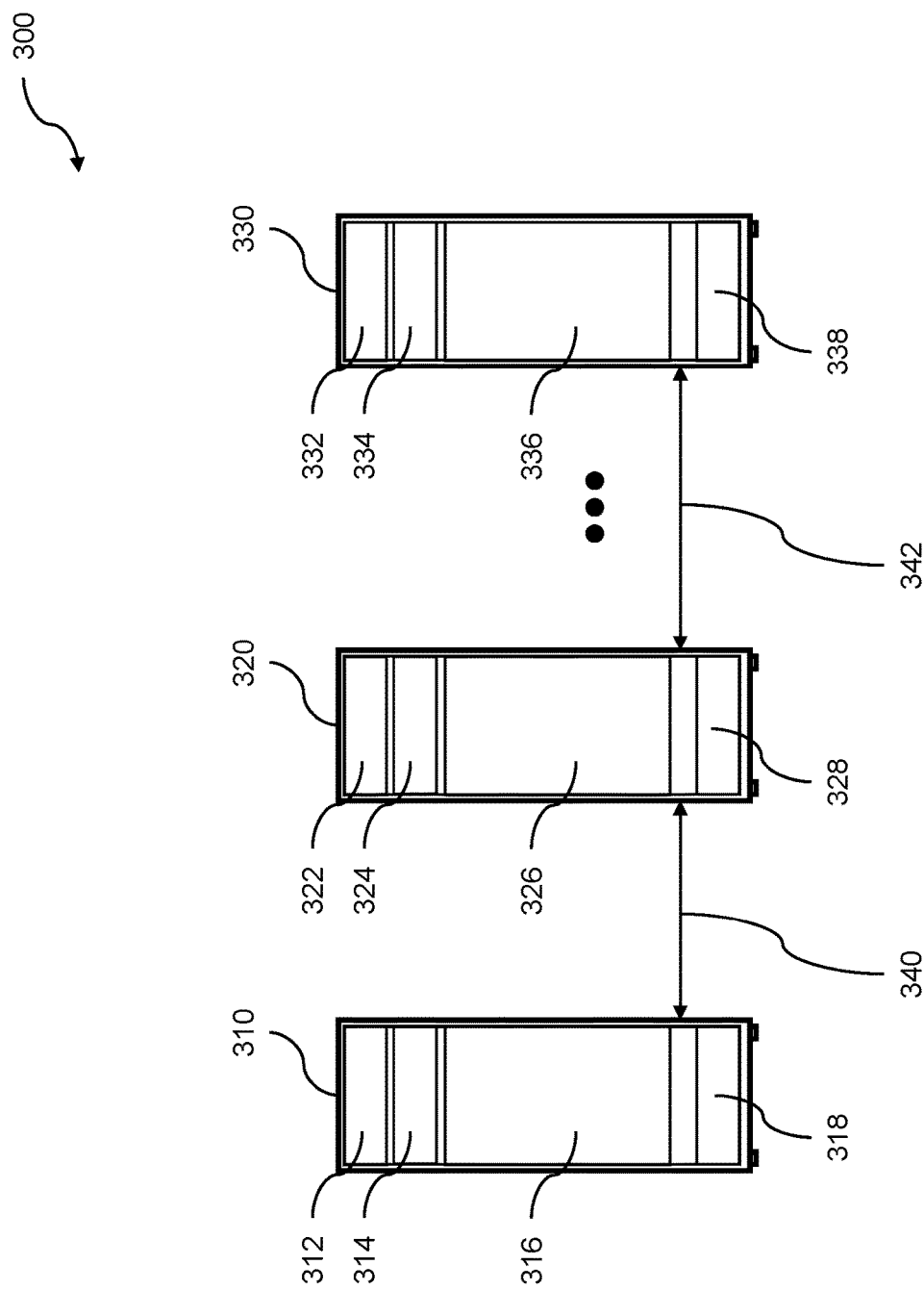
FIG. 3 shows for a data center representation.

FIG. 3 shows a data center representation. A data center can include multiple data racks. Example 300 includes three data racks, indicated as rack 310, rack 320, and rack 330. While three data racks are shown in example 300, in practice, there can be more or fewer data racks. The data rack 310 includes a power cache 312, a server 314, another server 316, and a power supply 318. The power supply 318 can be used for AC-DC conversion and/or filtering of power to be used by the servers 314 and 316, as well as replenishment of the power cache 312. In embodiments, the power cache 312 includes an array of rechargeable batteries. In embodiments, the batteries include, but are not limited to, lead-acid, nickel metal hydride (NiMH), lithium ion (Li-ion), nickel cadmium (NiCd), and/or lithium ion polymer (Li—Po) batteries. Similarly, the data rack 320 includes a power cache 322, a first server 324, a second server 326, and a power supply 328. Furthermore, the data rack 330 includes a power cache 332, a first server 334, a second server 336, and a power supply 338. The data racks are interconnected by communication links 340 and 342. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 300, a power cache can be on each of the multiple data racks within the data center. In embodiments, the power cache includes multiple batteries spread across the multiple data racks.

Figure 4:
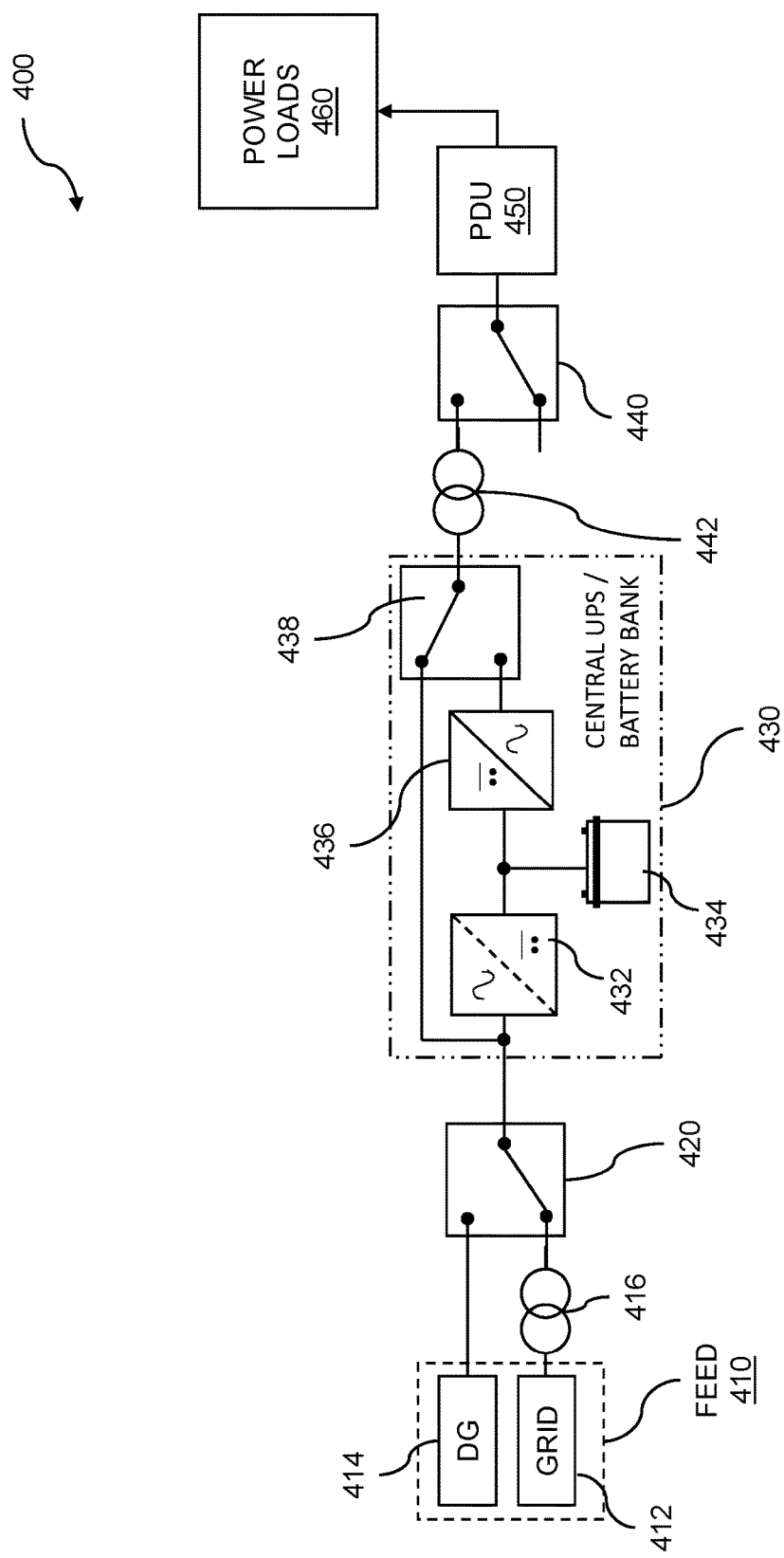
FIG. 4 illustrates a topology representation.

FIG. 4 illustrates a topology representation 400. A topology within the data center includes a rack distribution power unit. The topology includes a feed 410. The feed 410 includes a grid source 412, and a secondary, local source of a diesel generator (DG) 414. The grid source 412 is input to a power regulator 416 and then into one input of a switch block 420. The diesel generator 414 is connected to a second input of the switch block 420. The switch block 420 can be configured, based on a power policy, to select the diesel generator source or the grid source. The switch block 420 feeds into an uninterruptable power supply (UPS) 430 that contains a power cache 434. The uninterruptable power supply (UPS) 430 includes an AC-DC converter 432 configured to charge a power cache 434. In embodiments, the power cache 434 is a battery. The UPS 430 further includes a DC-AC converter 436 that feeds into an input of a switch block 438. The output of the switch block 438 feeds into a power regulator 442 and then to an input of a switch block 440. The switch block 438 can be configured by means of a power policy to provide power from the power cache or to bypass the power cache and provide power directly from the local or grid power source. The second input of the switch block 440 is not connected, such that if the second input is selected, the feed 410 is disconnected from the power distribution unit (PDU) 450. The PDU distributes power within a data center and feeds the power loads 460 within a data center. In embodiments, the main data center power is distributed to multiple power distribution units (PDUs), typically rated from 50 kVA to 500 kVA, throughout the data center premises. The PDU can include transformer-based and/or non-transformer distribution units. PDUs can be supplied from centralized breakers and are generally placed along the perimeter of the space throughout the room. The PDU can have a data rack form factor that allows for placement adjacent to a row of data racks enabling power distribution in closer proximity to the load. Branch circuits are distributed from the PDUs to the data racks. Each data rack enclosure uses one or more branch circuits. Thus, in embodiments, the topology within the data center includes a power data unit. In some embodiments, the topology within the data center includes circuit breakers. In embodiments, a topology within the data center includes a floor distribution power unit.

The topology within the data center can include a variety of components, including, but not limited to, circuit breakers, an uninterruptable power supply, and/or a power data unit. In embodiments, the first set of power caches provides power when power requirements from the first set of power loads exceed the capabilities of the first set of power supplies.

Figure 5:
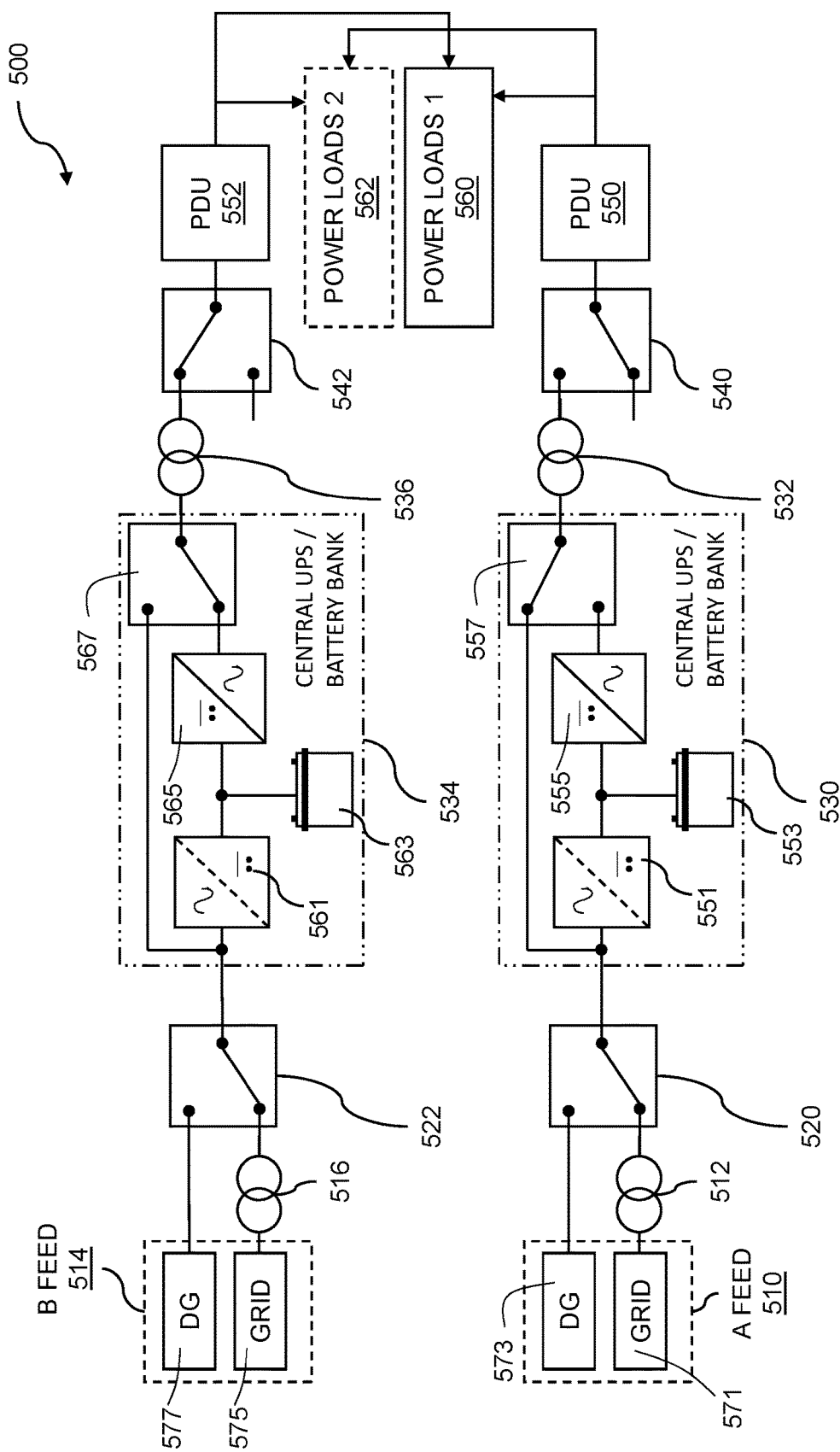
FIG. 5 shows a topology representation with multiple sets.

FIG. 5 shows a topology representation with multiple sets. The topology representation 500 includes a first main power source 510, referred to as the "A feed." The topology representation 500 further includes a second main power source 514, referred to as the "B feed." Each feed is capable of powering each device in the data center simultaneously. This configuration is referred to as 2N redundancy for power. The A feed 510 includes a grid source 571, and a secondary, local source of a diesel generator (DG) 573. The grid source 571 is input to a power regulator 512 and then into one input of a switch block 520. The diesel generator 573 is input to a second input of the switch block 520. The switch block 520 can be configured, by arrangement of a power policy, to select the diesel generator source or the grid source. The switch block 520 feeds into an uninterruptable power supply (UPS) 530. The UPS 530 includes an AC-DC converter 551 configured to a charge a power cache 553. In embodiments, the power cache 553 is a battery. The UPS 530 further includes a DC-AC converter 555 that feeds into an input of a switch block 557. The output of the switch block 520 feeds into a second input of the switch block 557. The output of the UPS 530 is input to a power regulator 532 and then to an input of a switch block 540. The switch block 557 can be configured, based on a power policy, to provide power from the power cache, or to bypass the power cache and provide power directly from the local or grid power source. The second input of the switch block 540 is not connected, such that if the second input is selected, the A feed 510 is disconnected from the PDU 550. The PDU (Power Distribution Unit) distributes power within a data center and feeds the power loads 560 within the data center. In embodiments, a second set of power loads 562 may be added as part of a simulation of a dynamic power scenario.

Similarly, the B feed 514 includes a grid source 575, and a secondary, local source of a diesel generator (DG) 577. The grid source 575 is input to a power regulator 516 and then into one input of a switch block 522. The diesel generator 577 is input to a second input of the switch block 522. The switch block 522 can be configured, based on a power policy, to select the diesel generator source or the grid source. The switch block 522 feeds into a UPS 534. The UPS 534 includes an AC-DC converter 561 configured to charge a power cache 563. In embodiments, power cache 563 may be a battery. The UPS 534 further includes a DC-AC converter 565 that feeds into an input of a switch block 567. The output of the switch block 522 feeds into a second input of a switch block 567. The switch block 567 can be configured, based on a power policy, to provide power from the power cache, or to bypass the power cache and provide power directly from the local or grid power source. The output of the UPS 534 is input to a power regulator 536, and then to an input of a switch block 542. The second input of the switch block 542 is not connected, such that if the second input is selected, the B feed 514 is disconnected from the PDU 552, which in turn feeds the first set of power loads 560 and/or the second set of power loads 562 within the data center.

Thus, the A feed 510 and the B feed 514 comprise a first main power source and a second main power source. The power source and the second power source can provide 2N redundancy to the power load. Furthermore, in embodiments, the power source and a second power source share power to the multiple data racks, wherein the power is shared on a fractional basis. A variety of dynamic power scenarios can be simulated based on the topology shown in FIG. 5.

Figure 6:
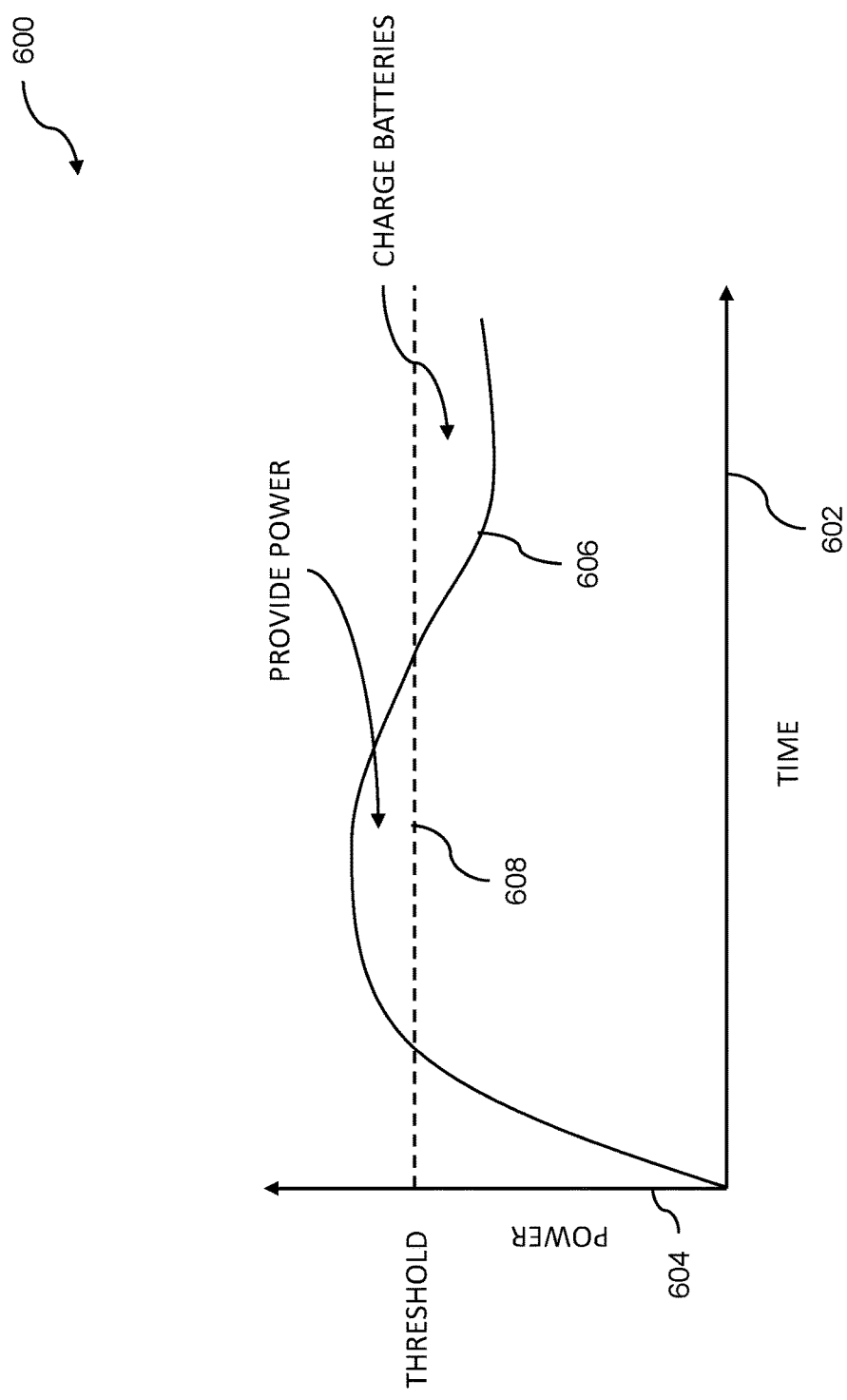
FIG. 6 illustrates a power consumption curve.

FIG. 6 illustrates a power consumption curve. A graph 600 includes a horizontal axis 602 representing time and a vertical axis 604 representing power consumption of a power load (such as a data center group, cluster, or data rack). A predetermined threshold 608 is established based on a power policy. The power policy can be defined by an administrator at the data center, a local power utility, or the like. The curve 606 represents the power consumption of a power load over time. During periods where the curve 606 is above the threshold 608, power is provided to the load by the power cache. During periods where the curve 606 is below the threshold 608, the power cache is replenished. In the case where the power cache comprises one or more batteries, the batteries are charged when the curve 606 is below the threshold 608. In embodiments, enabling the power cache comprises peak shaving.

Figure 7A:
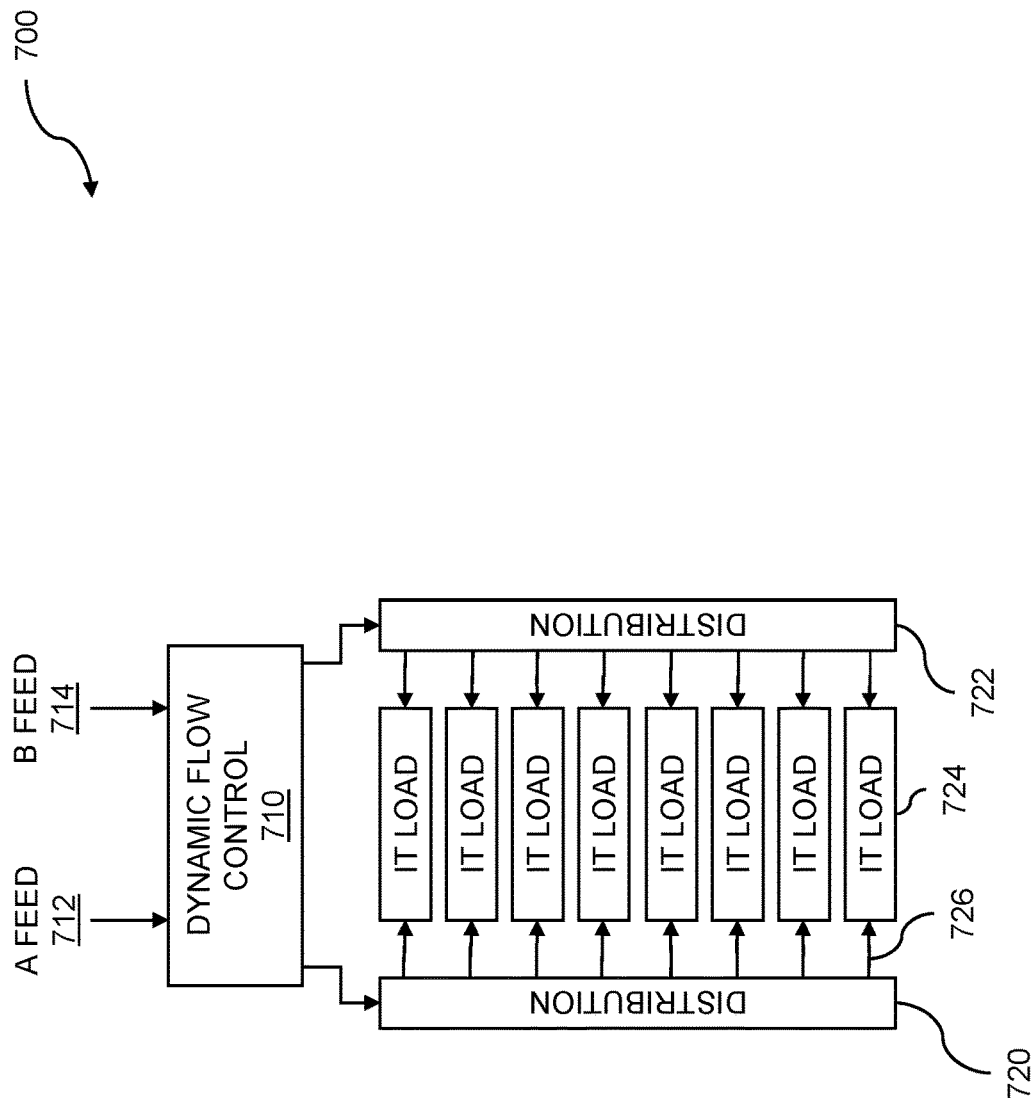
FIG. 7A shows dynamic power configuration at time $t_0$.

FIG. 7A shows dynamic power configuration at time $t_0$. The simulating provides a time-dependent result over the period of time. The example 700 shows a plurality of IT loads, indicated generally as 724. Example 700 shows two distribution feeds providing power to the IT loads 724. An A feed 712 and a B feed 714 are input into a dynamic flow controller 710. The dynamic flow controller 710 distributes power from A feed 712 to distribution network 720, which can supply one or more IT loads via power connections, indicated generally as 726. Similarly, the dynamic flow controller 710 distributes power from B feed 714 to distribution network 722, which can also supply one or more IT loads. In some scenarios, a combination of power sourced from the A feed 712 and the B feed 714 are used to power the IT loads 724.

Figure 7B:
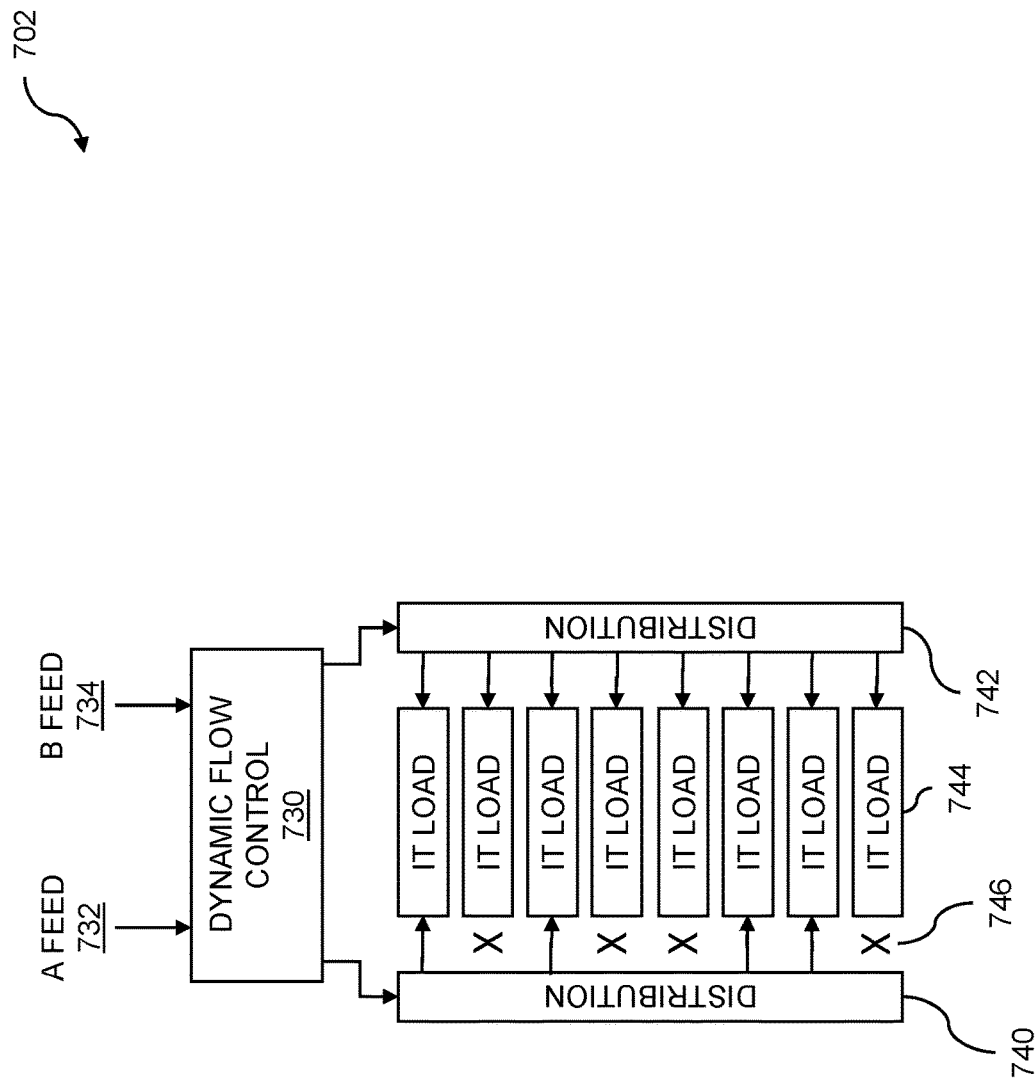
FIG. 7B shows dynamic power configuration at time $t_0+t_1$.

FIG. 7B shows dynamic power configuration at time $t_0+t_1$. The example 702 shows a plurality of IT loads, indicated generally as 744. Example 702 shows two distribution feeds providing power to the IT loads 744. An A feed 732 and a B feed 734 are input into a dynamic flow controller 730. The dynamic flow controller 730 distributes power from A feed 732 to distribution network 740, which can supply one or more IT loads. Similarly, the dynamic flow controller 730 distributes power from B feed 734 to distribution network 742, which can also supply one or more IT loads. At time $t_1$, there are multiple outages within the distribution network 740, each indicated as an "X" and shown generally by reference number 746. This partial outage can cause the dynamic flow controller 730 to increase power from B feed 734 that is supplied through distribution network 742.

Figure 7C:
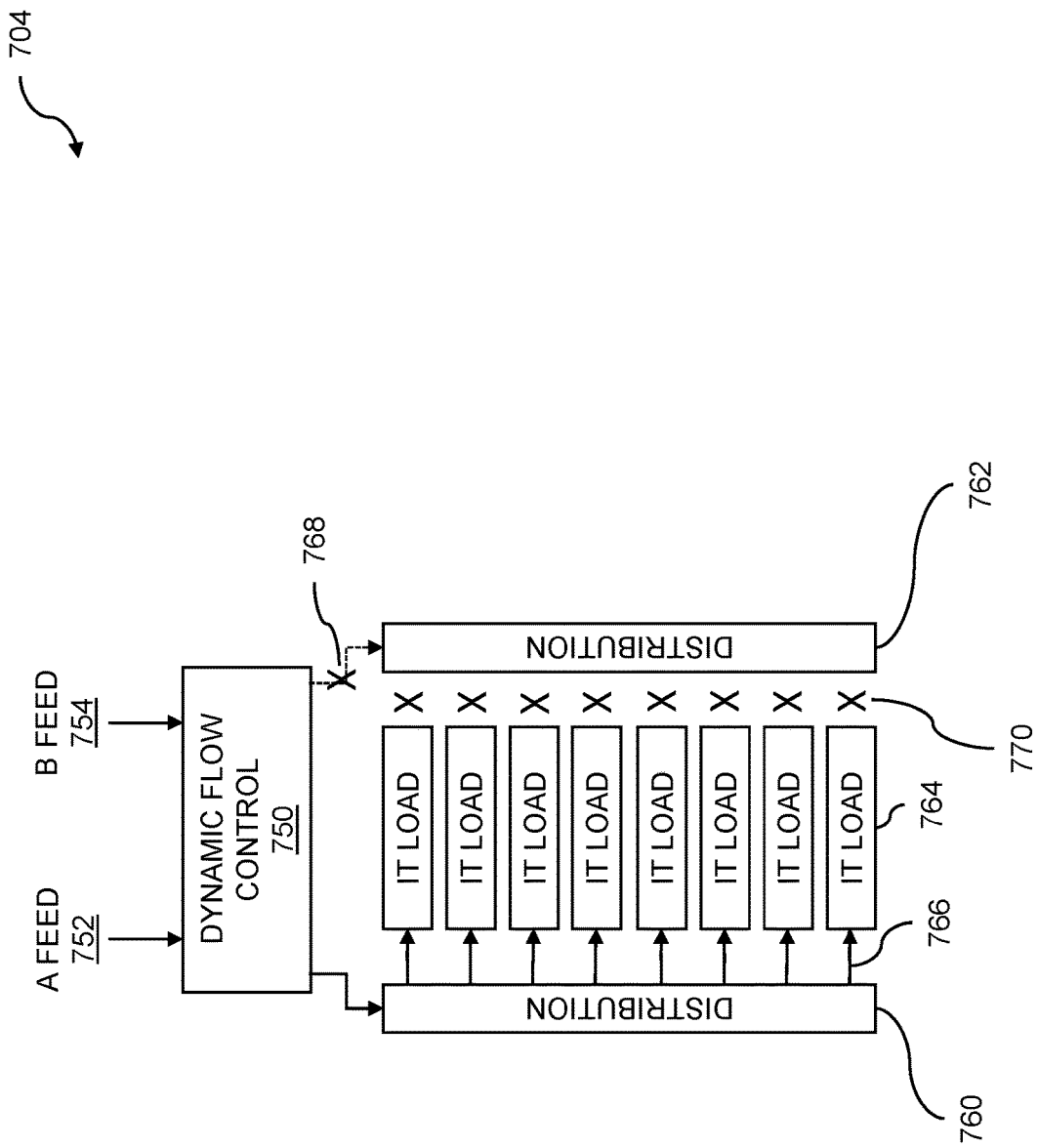
FIG. 7C shows dynamic power configuration at time $t_0+t_2$.

FIG. 7C shows dynamic power configuration at time $t_0+t_2$. The example 704 shows a plurality of IT loads, indicated generally as 764. Example 704 shows two distribution feeds providing power to the IT loads 764. An A feed 752 and a B feed 754 are input into a dynamic flow controller 750. The dynamic flow controller 750 distributes power from A feed 752 to distribution network 760, which can supply one or more IT loads. Similarly, the dynamic flow controller 750 distributes power from B feed 754 to distribution network 762, which can also supply one or more IT loads. At time $t_2$, there is a complete outage of the B feed 754, indicated by reference number 768. As a result, the entire distribution network 762 is out (offline), as indicated by the "X" symbols referred to generally by reference 770. Since distribution network 762 is offline, all power to the IT loads is provided by distribution network 760 via connections 766. This outage of the B feed 754 can cause a failure in a simulation of a dynamic power scenario. As a result of the failure, engineers and/or operators at the data center can plan for such an event. For example, additional power caches or power supplies can be added and the dynamic power scenario can be re-simulated to see if the power need can be handled by additional resources upon the complete loss of the B feed 754. Thus, in embodiments, the simulating provides a time-dependent result over the period of time.

In general, the simulation of a dynamic power scenario may include computing a power differential D, at any time t, and may be computed as:

$$D(t)=S(t)+C(t)-L(t), \text{ where:}$$

D(t) is a power differential at time t;

S(t) is the amount of power available to be supplied from power supplies at time t; and C(t) is the amount of power originating from power caches at time t.

In some embodiments, an operating range can be established for D(t). The operating range can be for a data rack, a cluster of data racks, an entire data center, and/or any other hierarchical level specified for the data center. A separate operating range may be specified for each hierarchical level. As an example, an operating range for a data center can be specified with a lower limit of 1 kW, and an upper limit of 2 kW. If, at any time during the simulation of a dynamic power scenario, the value of D(t) exceeds the specified range, a warning can be provided to a user. The warning may be provided in the form of a report, e-mail, text message, or another suitable format. If the value of D(t) falls below the lower limit, it could indicate that the data center is at risk of an outage due to lack of available power at time t. If the value of D(t) exceeds the upper limit, it could indicate that the data center is not operating in an efficient range. In such cases, additional simulations may be performed with additional power loads connected in the topology to determine if configuration changes can be made to bring the data center into a more efficient operating range.

In embodiments, other parameters are also factored into the simulation. These factors can include, but are not limited to, electrical properties of circuit breakers and/or electrical conduits. The electrical properties can include resistance, capacitance, inductance, and/or other suitable electrical properties. In some embodiments, the operating temperature of a data center and/or data center components may be factored into the simulation. Electrical properties can change as a function of temperature. Hence, the electrical properties may be simulated as functions of temperature and/or AC frequency in order to achieve more realistic simulations of dynamic power scenarios.

Figure 8:
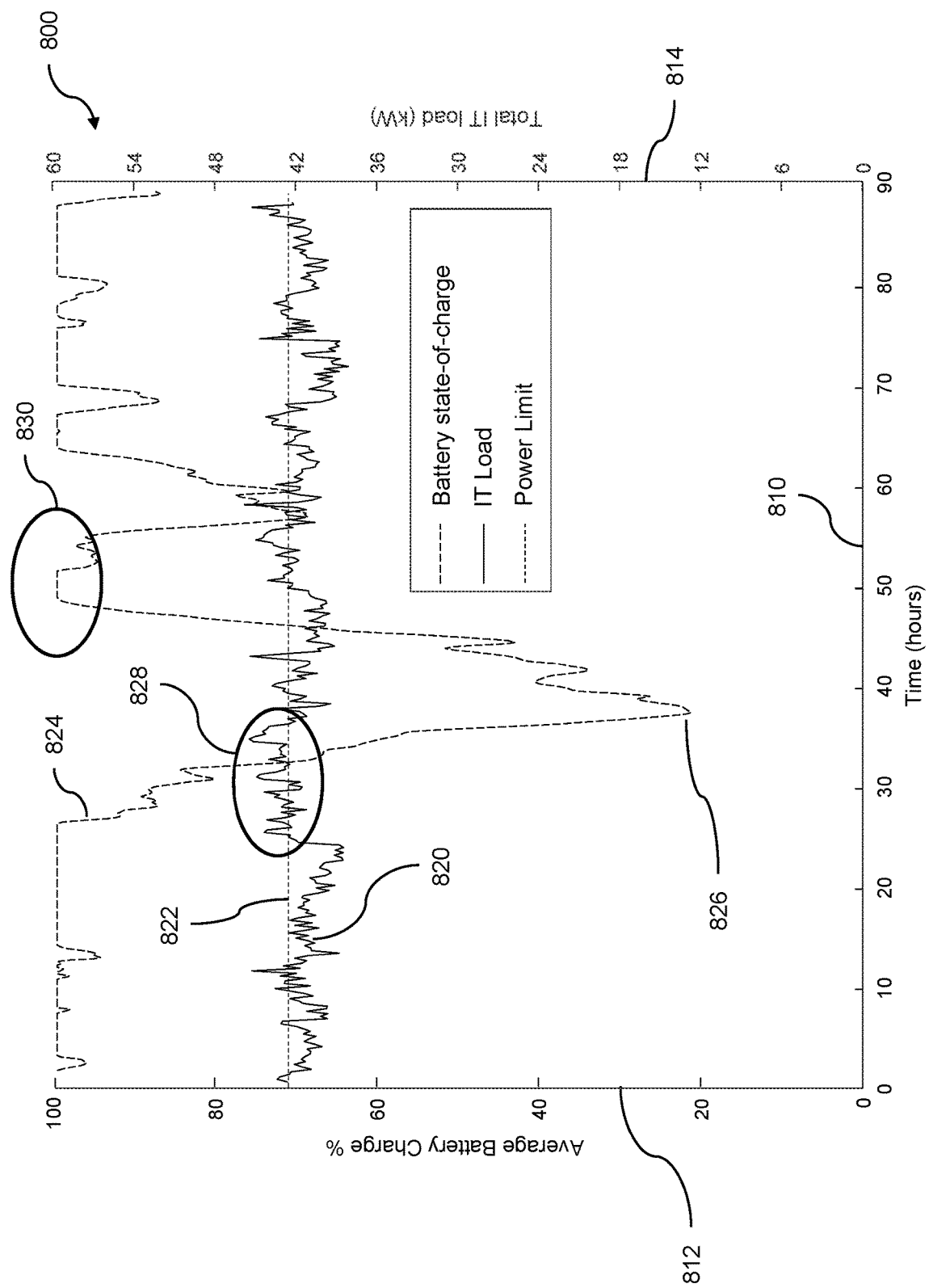
FIG. 8 illustrates dynamic data center power management.

FIG. 8 illustrates dynamic data center power profile. The power profile can be used as part of a dynamic power scenario. The dynamic power scenario includes a temporal component. The simulating of the power scenario covers a period of time in the data center. The profile 800 is illustrated by a graph with a horizontal time axis 810, which shows elapsed time for a data center in hours. The profile 800 graph also includes a left vertical axis 812, which shows the average battery life availability percentage. The profile 800 graph also includes right vertical axis 814, which shows total information technology (IT) load for the data center as measured in kW. Battery state-of-charge line 824 can be read based on the scale for left vertical axis 812. The battery state-of-charge line 824 starts at or near 100% and decreases as power is drawn from data center batteries to help supply the IT load. A dynamic IT load line 820 shows the dynamic variation in IT power load draw as a function of time and is read from right vertical axis 814. A power limit line 822 can also be read based on right vertical axis 814 to indicate the total power available from the power topology without any additional battery power being supplied. In profile 800, power limit line 822 is shown at about 42.5 kW.

During time when the dynamic IT load line 820 exceeds power limit line 822, the additional needed power is sourced from the data center topology batteries. The battery state-of-charge line 824 reflects the power draw and commensurate depletion of the battery charge. For extended hours of IT load exceeding the power limit as shown in region 828, severe battery state-of-charge depletion occurs, as shown by trough 826 in battery state-of-charge line 824. As the IT load then subsequently relaxes below the power limit for much of the time immediately following region 828, the data center topology batteries can recharge back up to near 100% as shown by region 830. Because the IT load frequently goes above the power limit line 822, typical data center power topology would require that the power limit be increased or the IT load decreased or throttled. In both cases, a more efficient solution for the data center is accomplished through data center power scenario simulation. While batteries are shown in profile 800, other power caches are comprehended by the invention described herein.

Figure 9:
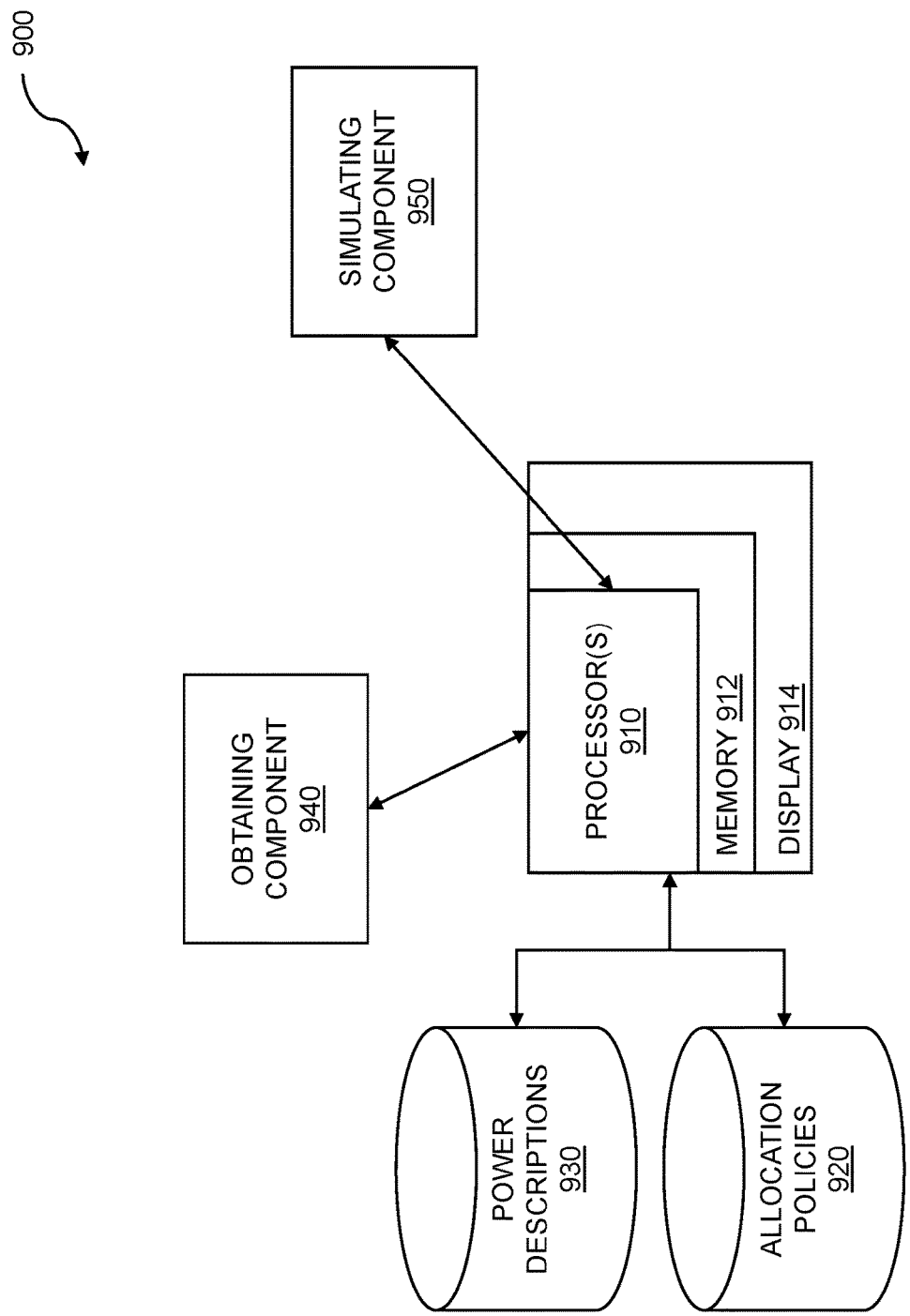
FIG. 9 shows a system diagram for data center power scenario simulation.

FIG. 9 shows a system diagram for data center power scenario simulation. The system 900 can include one or more processors 910 and a memory 912 which stores instructions. The memory 912 is coupled to the one or more processors 910, wherein the one or more processors 910 can execute instructions stored in the memory 912. The memory 912 can be used for storing instructions, for storing databases of power sources, power caches, and power loads, for storing information pertaining to load requirements or redundancy requirements, for storing power policies, for system support, and the like. Information about the simulations of dynamic power scenarios can be shown on a display 914 connected to the one or more processors 910. The display can comprise a television monitor, a projector, a computer monitor (including a laptop screen, a tablet screen, a netbook screen, and the like), a smartphone display, a mobile device, or another electronic display.

The system 900 includes allocation policies 920. In embodiments, the allocation policies 920 are stored in a networked database, such as a structured query language (SQL) database. The allocation policies 920 can include limits, such as power consumption limits, as well as switch configurations when certain conditions are met. For example, when conditions allow peak shaving to take place, and surplus power exists, the power policies can direct switches and their configurations to allow replenishing of the power caches. The system 900 further includes a repository of power descriptions 930. The power descriptions 930 can include, but are not limited to, power descriptions of power loads, power caches, power supplies, rack power profiles, batteries, busses, circuit breakers, fuses, and the like.

The system 900 includes an obtaining component 940. The obtaining component 940 is configured to obtain power load descriptions, power supply descriptions, power cache descriptions, circuit breaker descriptions, wiring descriptions, thermal profiles, and/or conjecture scenarios.

The system 900 includes a simulating component 950. The simulating component performs simulations based on the power descriptions 930. The simulating component may be configured to simulate previous power experiences, conjecture scenarios, and/or other dynamic power scenarios. In some embodiments, the simulating component may execute in a cloud analysis facility. For example, the power descriptions 930 can be transmitted to a simulating component within a cloud analysis facility using a set of Application Programming Interfaces (APIs). In this way, the scalability of cloud computing can be utilized for the purposes of simulating dynamic power scenarios.

In embodiments, the API can be a REST API that uses HTTP POST and HTTP GET operations to perform analysis of a dynamic power scenario based on power descriptions of components within a data center. The power description data can be sent in a request to the cloud analysis facility. In embodiments, the API uses JSON (JavaScript Object Notation) for both requests and responses.

The system 900 includes a computer system for power analysis comprising: a memory which stores instructions; one or more processors attached to the memory wherein the one or more processors, when executing the instructions which are stored, are configured to: obtain a description of a data center first set of power loads; obtain a description of a first set of power supplies coupled to the first set of power loads wherein the first set of power supplies is further coupled to a first set of power caches; and simulate a dynamic power scenario with the first set of power loads, the first set of power supplies, and the first set of power caches.

Disclosed embodiments can include a computer program product embodied in a non-transitory computer readable medium for power analysis, the computer program product comprising code which causes one or more processors to perform operations of: obtaining a description of a first set of power loads for a data center; obtaining a description of a first set of power supplies coupled to the first set of power loads wherein the first set of power supplies is further coupled to a first set of power caches; and simulating a dynamic power scenario with the first set of power loads, the first set of power supplies, and the first set of power caches.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for power analysis comprising:
 obtaining, on a first computing device, a description of a first set of power loads for a data center;
 obtaining, on the first computing device, a description of a first set of power supplies coupled to the first set of power loads wherein the first set of power supplies is further coupled to a first set of power caches; and
 simulating, on a second computing device, a dynamic power scenario with the first set of power loads, the first set of power supplies, and the first set of power caches wherein the simulating includes evaluating the first set of power loads based on applications running on a load platform within the first set of power loads, and wherein the simulating further includes evaluating an estimated completion time for a task associated with at least one of the applications, based on a number of processing cores allocated for the task, wherein the simulating includes evaluating the first set of power loads using a first randomized pattern of component usage and performance for the first set of power loads, wherein the first randomized pattern of component usage and performance includes:
  a power supply randomization range for a power supply, and wherein the power supply randomization range has a zero minimum value and a maximum output based on a maximum operating condition of the power supply;
  one or more of the power supplies coming offline at various random times;
  one or more of the power loads being activated at random times;
  power consumption increasing at random times; and
  power caches failing at random times.

2. The method of claim 1 wherein the first set of power loads is distributed across a plurality of data racks.

3. The method of claim 1 wherein the first set of power caches provides power when power requirements from the first set of power loads exceed capabilities of the first set of power supplies.

4. The method of claim 3 wherein the capabilities of the first set of power supplies are defined by parameter policies.

5. The method of claim 4 further comprising validating a set of power policies based on the simulating wherein the power policies determine how power is allocated among various devices within the data center.

6. The method of claim 5 wherein the validating further comprises validation of a power configuration topology within the data center.

7. The method of claim 6 wherein the simulating identifies that the data center is operating outside a preferred efficiency range and updates the power configuration topology to improve efficiency.

8. The method of claim 6 further comprising changing topology of the data center as part of the validating and re-simulating the dynamic power scenario.

9. The method of claim 8 wherein the changing topology includes removing part of the first set of power supplies.

10. The method of claim 8 wherein the changing topology includes removing part of the first set of power caches.

11. The method of claim 8 wherein the changing topology includes removing part of the first set of power loads.

12. The method of claim 8 wherein the re-simulating includes evaluation of a conjecture scenario for power consumption.

13. The method of claim 1 wherein the simulating of the dynamic power scenario covers a period of time in the data center.

14. The method of claim 13 wherein the simulating analyzes a previous power experience by the data center.

15. The method of claim 14 wherein the previous power experience includes a failure power scenario.

16. The method of claim 15 wherein the simulating includes a resolution to the previous power experience that includes the failure for the dynamic power scenario.

17. The method of claim 1 wherein the simulating analyzes a failure for the dynamic power scenario.

18. The method of claim 17 wherein the failure includes a capacity, for the first set of power supplies and the first set of power caches, being exceed by the first set of power loads.

19. The method of claim 1 wherein the simulating further includes evaluating the first set of power loads with a second randomized pattern of component usage for the first set of power loads.

20. The method of claim 19 further comprising selecting one of the first randomized patterns of component usage and the second randomized pattern of component usage, based on a selection criterion, for operation of the first set of power loads.

21. The method of claim 1 wherein the simulating includes validating a data center power configuration.

22. The method of claim 1 wherein the simulating includes providing recommendations for changing topology of the data center.

23. The method of claim 1 wherein the first computing device and the second computing device are a common computing device.

24. The method of claim 1 further comprising providing information on the power scenario and the simulating to a cloud analysis facility.

25. The method of claim 1 further comprising augmenting the simulating with information from a cloud analysis facility.

26. The method of claim 1 wherein the simulating further includes evaluating, for each processing core from the number of processing cores, a core type, wherein the core type includes a single core processing unit and a multiple core processing unit.

27. A computer program product embodied in a non-transitory computer readable medium for power analysis, the computer program product comprising code which causes one or more processors to perform operations of:

obtaining, on a first computing device, a description of a first set of power supplies coupled to the first set of power loads wherein the first set of power supplies is further coupled to a first set of power caches; and simulating, on a second computing device, a dynamic power scenario with the first set of power loads, the first set of power supplies, and the first set of power caches wherein the simulating includes evaluating the first set of power loads based on applications running on a load platform within the first set of power loads, and wherein the simulating further includes evaluating an estimated completion time for a task associated with at least one of the applications, based on a number of processing cores allocated for the task, wherein the simulating includes evaluating the first set of power loads using a first randomized pattern of component usage and performance for the first set of power loads, wherein the first randomized pattern of component usage and performance includes:

a power supply randomization range for a power supply, and wherein the power supply randomization range has a zero minimum value and a maximum output based on a maximum operating condition of the power supply; and power consumption increasing at random times.

28. A computer system for power analysis comprising:

a memory which stores instructions;

one or more processors attached to the memory wherein the one or more processors, when executing the instructions which are stored, are configured to:

obtain a description of a first set of power loads for a data center;

obtain a description of a first set of power supplies coupled to the first set of power loads, wherein the first set of power supplies is further coupled to a first set of power caches;

simulate a dynamic power scenario with the first set of power loads, the first set of power supplies, and the first set of power caches; and evaluate the first set of power loads based on applications running on a load platform within the first set of power loads, and wherein simulation further includes evaluating an estimated completion time for a task associated with at least one of the applications, based on a number of processing cores allocated for the task, wherein the simulating includes evaluating the first set of power loads using a first randomized pattern of component usage and performance for the first set of power loads, wherein the first randomized pattern of component usage and performance includes:

a power supply randomization range for a power supply, and wherein the power supply randomization range has a zero minimum value and a maximum output based on a maximum operating condition of the power supply; and power cache failures.

* * * * *